US011470214B2

(12) United States Patent
Ikeda (10) Patent No.: US 11,470,214 B2
(45) Date of Patent: Oct. 11, 2022

(54) INFORMATION PROCESSING APPARATUS, METHOD FOR CONTROLLING APPARATUS, AND RECORDING MEDIUM

(71) Applicant: Yuji Ikeda, Kanagawa (JP)

(72) Inventor: Yuji Ikeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/510,420

(22) Filed: Oct. 26, 2021

(65) Prior Publication Data

US 2022/0131992 A1    Apr. 28, 2022

(30) Foreign Application Priority Data

Oct. 27, 2020   (JP) .............................. JP2020-179765
Sep. 22, 2021   (JP) .............................. JP2021-154172

(51) Int. Cl.
   *H04N 1/00*   (2006.01)
(52) U.S. Cl.
   CPC ..... *H04N 1/00891* (2013.01); *H04N 1/00037* (2013.01); *H04N 1/00408* (2013.01)
(58) Field of Classification Search
   CPC ........... H04N 1/00891; H04N 1/00037; H04N 1/00408; H04N 1/00344; G05B 2219/32226
   See application file for complete search history.

(56) References Cited

U.S. PATENT DOCUMENTS

2019/0064905 A1* 2/2019 Ogushi ................. G06F 3/1229

FOREIGN PATENT DOCUMENTS

| JP | 2000-062215 | 2/2000 |
| JP | 2005-006110 | 1/2005 |
| JP | 2005-225177 | 8/2005 |

OTHER PUBLICATIONS

English Machine Translation of JP 1998-0078150-A (Yamazaki, Published Oct. 5, 1999) (Year: 1999).*

* cited by examiner

*Primary Examiner* — Juan M Guillermety
(74) *Attorney, Agent, or Firm* — Xsensus LLP (57) ABSTRACT

An information processing apparatus includes a component to be maintained, a maintenance engine configured to perform maintenance on the component, and circuitry. The circuitry turns on a power supply to the apparatus at a power-on time set in advance by a timer; acquires, from a memory, a scheduled time of periodic maintenance to be executed on the component; turns on the power supply at a time prior to the scheduled time of the periodic maintenance; and shuts down the apparatus in response to an end of the periodic maintenance. In response to an arrival of the power-on time by the timer during execution of the periodic maintenance, the circuitry controls a state of the power supply to be kept at an on-state after the periodic maintenance ends.

12 Claims, 10 Drawing Sheets

|  | EVENT TYPE | SHUTDOWN AFTER EVENT |
|---|---|---|
| (1) | WEEKLY TIME POWER ON | NO |
| (2) | LOG SAVE TIME | YES |
| (3) | AUTOMATIC FIRMWARE UPDATE TIME | YES |
| (4) | ADDRESS BOOK BACKUP TIME | YES |
| (5) | BRIGHTNESS DETECTION | NO |
|  | ... | ... |

INFORMATION PROCESSING APPARATUS, METHOD FOR CONTROLLING APPARATUS, AND RECORDING MEDIUM

CROSS-REFERENCE TO RELATED APPLICATIONS

This patent application is based on and claims priority pursuant to 35 U.S.C. § 119(a) to Japanese Patent Application Nos. 2020-179765, filed on Oct. 27, 2020, and 2021-154172, file on Sep. 22, 2021, in the Japan Patent Office, the entire disclosure of which is hereby incorporated by reference herein.

BACKGROUND

Technical Field

Embodiments of this disclosure relate to an information processing apparatuses, a method for controlling an apparatus, and a recording medium.

Related Art

Some image forming apparatuses perform periodic maintenance (e.g., inkjet nozzle cleaning). There is an image forming apparatus that automatically starts and performs the periodic maintenance when left with a main power supply turned off and with a power supply plug connected to a commercial alternating-current (AC) power supply. In such an image forming apparatus, the main power supply is turned off after the periodic maintenance completes.

For example, there is a technology of allowing reception of a print instruction at the same time as activation of a waiting timer for reducing a waiting time (unprintable time) of a user after automatic maintenance.

SUMMARY

An embodiment of the present disclosure provides an information processing apparatus that includes a component to be maintained, a maintenance engine configured to perform maintenance on the component, and circuitry. The circuitry turns on a power supply to the apparatus at a power-on time set in advance by a timer; acquires, from a memory, a scheduled time of periodic maintenance to be executed on the component; turns on the power supply at a time prior to the scheduled time of the periodic maintenance; and shuts down the apparatus in response to an end of the periodic maintenance. In response to an arrival of the power-on time by the timer during execution of the periodic maintenance, the circuitry controls a state of the power supply to be kept at an on-state after the periodic maintenance ends.

Another embodiment provides a method for controlling an apparatus including a component to be maintained. The method includes turning on a power supply to the apparatus at a power-on time set in advance with a timer; acquiring, from a memory, a scheduled time of periodic maintenance to be executed on the component; turning on the power supply at a time prior to the scheduled time of the periodic maintenance; and shutting down the apparatus in response to an end of the periodic maintenance. The method further includes controlling a state of the power supply to be kept at an on-state after the periodic maintenance ends when the power-on time by the timer arrives during execution of the periodic maintenance.

Another embodiment provides a non-transitory recording medium storing a program which, when executed by one or more processors, cause the one or more processors to perform the method described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to drawings, embodiments of the present disclosure are described below in detail with reference to the drawings. However, elements, types, combinations of elements, shapes of the elements, and relative positions of elements in the embodiments are examples and do not limit the scope of appended claims. As used herein, the singular forms "a," "an," and "the" are intended to include the plural forms as well, unless the context clearly indicates otherwise.

As aspect of the present disclosure is an information processing apparatus that maintains an on-state of a power supply in a case where the time to execute a scheduled event arrives during periodic maintenance. Since the power-on state is maintained, the scheduled event occurring during the periodic maintenance is executed.

Structure of Image Forming Apparatus

Figure 1:
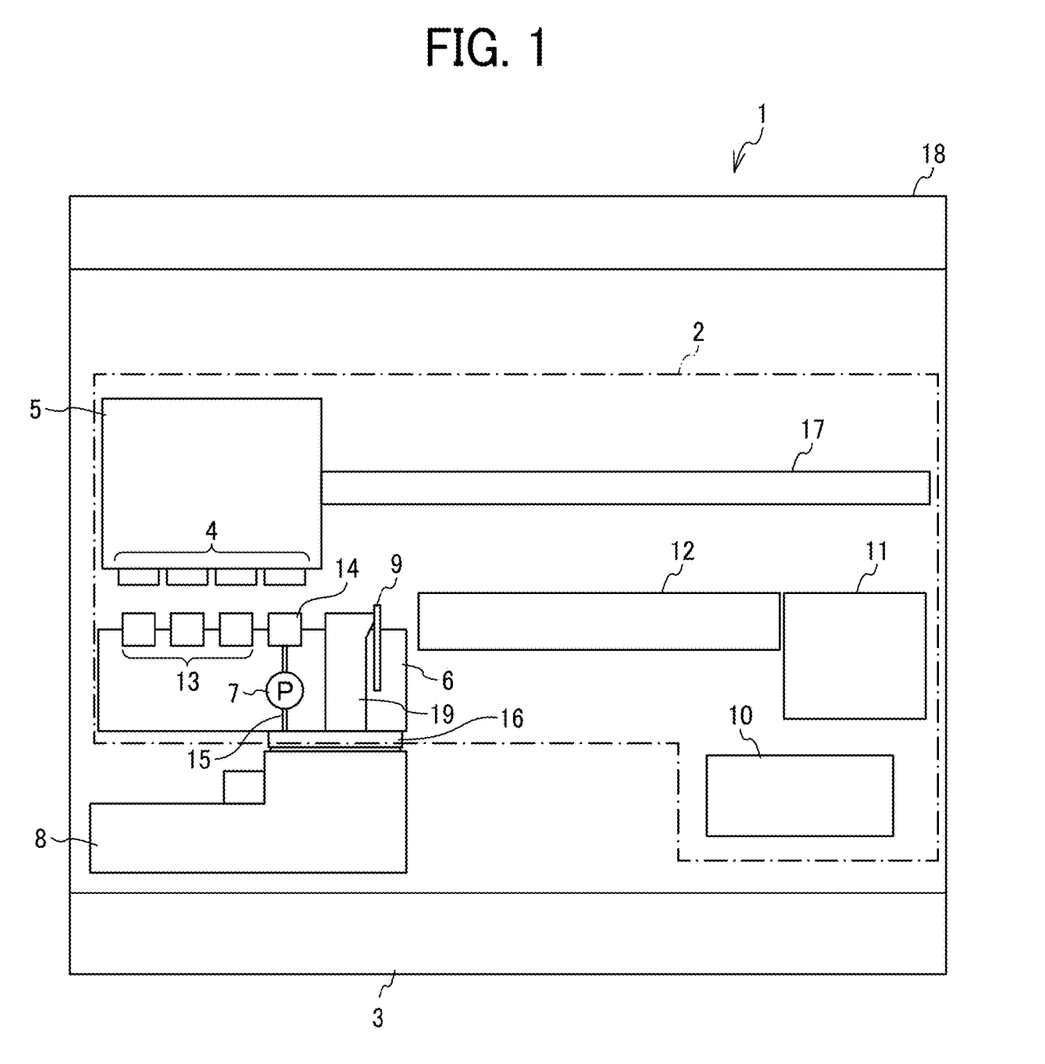
FIG. 1 is a conceptual diagram illustrating a general arrangement of an inkjet recording apparatus (an image forming apparatus) as one example of an information processing apparatus according to embodiments of the present disclosure.

FIG. 1 is a diagram illustrating a general arrangement of an image forming apparatus 1 as one example of an information processing apparatus according to a first embodiment of the disclosure. The image forming apparatus 1 is an inkjet recording apparatus.

The image forming apparatus 1 illustrated in FIG. 1 includes an engine 2 to form an image, a paper feeding tray 3 that stores recording media sheets such as paper sheets, a waste liquid tank 8 that stores waste liquid, and a scanner 18. These components are disposed inside the body of the image forming apparatus 1 (hereinafter referred to as "apparatus body").

The engine 2 includes a carriage 5 and a rod 17. The engine 2 moves the carriage 5 along the rod 17 in a main scanning direction (lateral direction in FIG. 1).

The engine 2 feeds a recording medium from a paper feeding tray 3 at the bottom of the apparatus body. The engine 2 discharges ink from a plurality of recording heads 4 mounted on the carriage 5 onto the recording medium, to form an image thereon, while a conveyor conveys the recording medium in a sub-scanning direction (a direction perpendicular to the paper surface on which FIG. 1 is drawn).

The engine 2 includes, in addition to the recording heads 4, a maintenance unit 6 including a suction pump 7, a suction cap 14, and a wiper blade 9 (a maintenance engine); caps 13; a drain tube 15; and a drain duct 16.

In the image forming apparatus 1, drying in the recording head 4 prevents proper discharge of ink.

Therefore, the engine 2 puts the cap 13 on the recording head 4 to moisturize the recording head 4.

Further, for the maintenance of the recording head 4, the engine 2 forcibly sucks the ink from inside the recording head 4 with the suction pump 7 after putting the suction cap 14 on the recording head 4. In the engine 2, the ink sucked by the suction pump 7 is drained, as waste liquid, from the suction pump 7 to the drain tube 15, and is stored through the drain duct 16 in the waste liquid tank 8.

When the ink is sucked from the recording head 4, the ink adheres to the nozzle surface of the recording head 4. Therefore, in the engine 2, the wiper blade 9 wipes the nozzle surface of the recording head 4, and the waste liquid is collected from an ink recovery port 19 to the waste liquid tank 8.

After such maintenance is performed, fresh ink is supplied to the recording head 4 so that printing is performed properly.

In FIG. 1, the image forming apparatus 1 include an ink cartridge 10, an ink container 11, and a sheet conveyor belt 12.

A description is given of the image forming apparatus 1 (the inkjet recording apparatus). The image forming apparatus 1, a multifunction peripheral (MFP), and the like are examples of the information processing apparatus.

Figure 2:
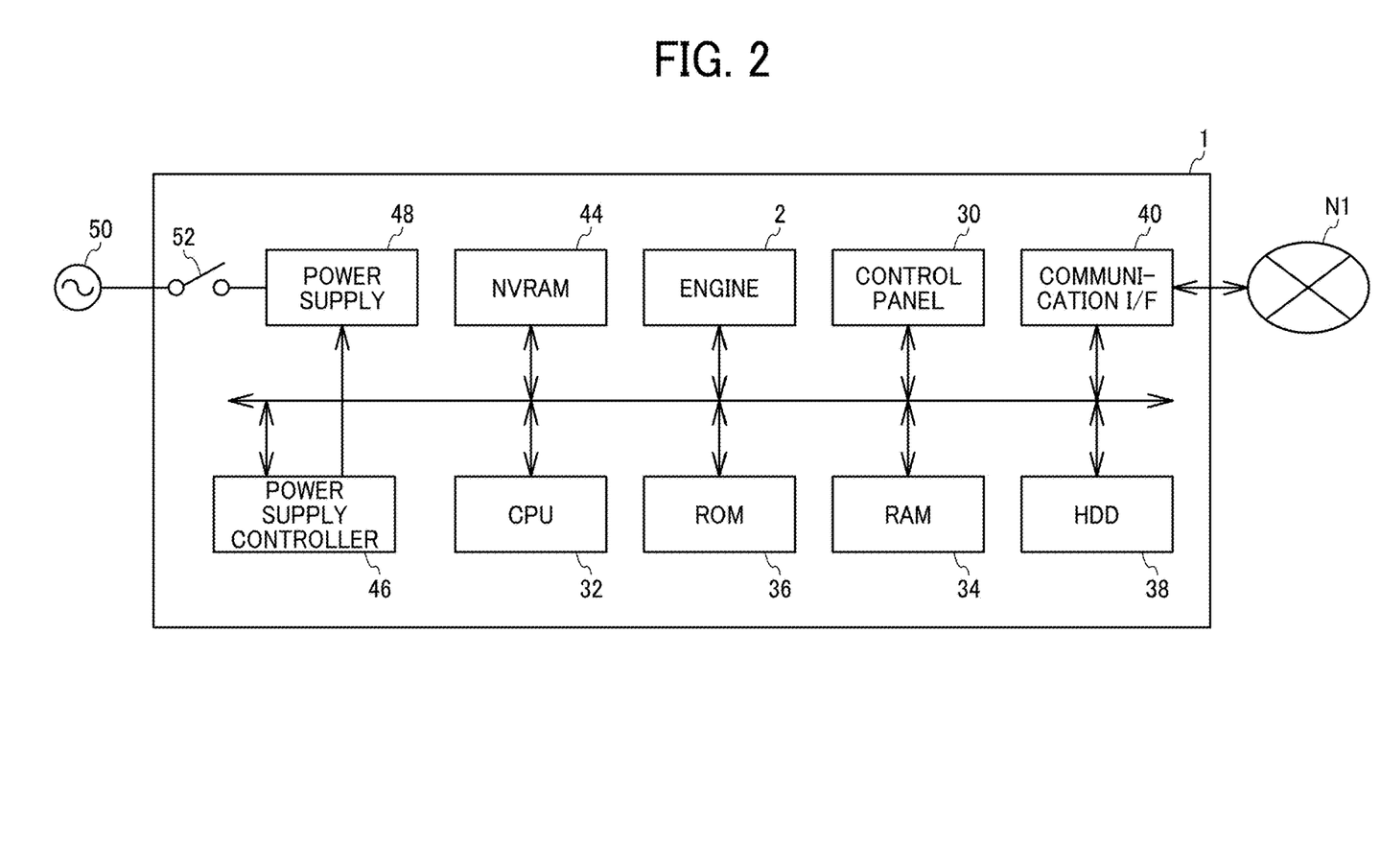
FIG. 2 is a block diagram illustrating a hardware configuration of the image forming apparatus according to embodiments of the present disclosure.

FIG. 2 is a block diagram illustrating a hardware configuration of the image forming apparatus 1 according to the first embodiment.

In addition to the components described above, the image forming apparatus 1 includes a control panel 30, a central processing unit (CPU) 32, a random access memory (RAM) 34, a read only memory (ROM) 36, a hard disk drive (HDD) 38, a power supply controller 46, a communication interface (I/F) 40, a non-volatile random access memory (NVRAM) 44, and a power supply 48 (for example, a power supply circuit). The control panel 30 includes a display 30a. The control panel 30 receives various inputs corresponding to operation by an operation (or user) and displays various types of information such as information indicating the operation received, information indicating the operational status of the image forming apparatus 1, and information indicating the setting of the image forming apparatus 1.

The CPU 32 controls the entire operation of the image forming apparatus 1. The CPU 32 executes a program stored in the ROM 36 or the HDD 38 using the RAM 34 as a work area, thereby controlling the entire operation of the image forming apparatus 1 and implementing various functions such as the copying function, scanning function, facsimile function, and printing function.

The communication I/F 40 is an interface for connection to a communication network N1.

The engine 2 is hardware that performs processing other than general-purpose information processing and communications. For example, the engine 2 provides the copying function, the scanning function, the facsimile function, and the printing function.

The engine 2 includes, for example, a scanner (image scanner) that scans and reads an image of a document, a plotter (image forming engine) that performs printing on a sheet such as paper, and a facsimile engine that performs facsimile communication. In some examples, the engine 2 further includes optional equipment such as a finisher that e.g., sorts or collates the printed sheets, and an automatic document feeder (ADF) that automatically feeds documents to be scanned.

The NVRAM 44 is a non-volatile memory that stores setting values such as scheduled time of periodic maintenance, timer setting, and network setting. The HDD 38 stores an address book of the user and accumulated image information.

The power supply controller 46 controls turning on and off of the power supply 48. The power supply controller 46 incorporates a real time clock (RTC) that measures time. The power supply controller 46 starts the image forming apparatus 1 upon arrival of a preset time while the power supply 48 is off.

The power supply 48 is connected to a commercial power supply 50 (e.g., an AC power supply) via a power switch 52. While the power switch 52 is on, the power supply 48 converts AC power supplied from the AC power supply into direct-current (DC) power and supplies the DC power to each component of the apparatus.

A description is given below of an inconvenience that may occur relating to periodic maintenance.

Figure 3:
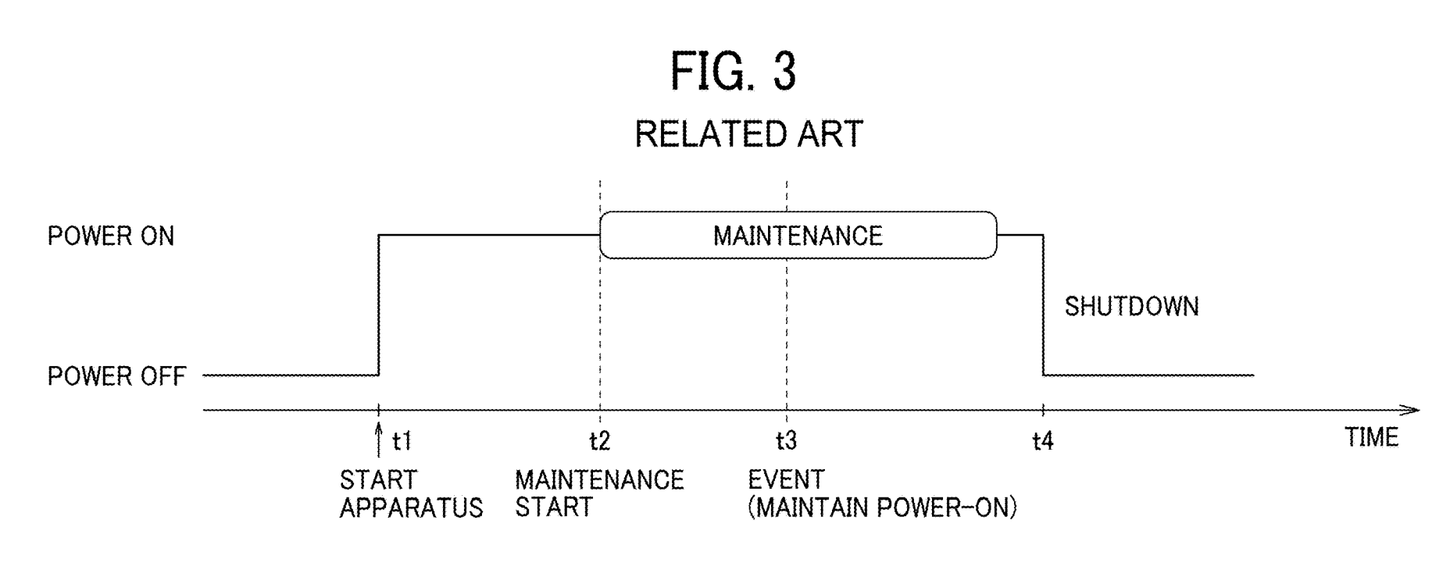
FIG. 3 is a timing chart illustrating an inconvenience relating to shutdown after periodic maintenance.

FIG. 3 is a timing chart illustrating the inconvenience relating to periodic maintenance.

Referring to FIG. 3, a time t1 is earlier by a threshold time than a scheduled start time (time t2) of the periodic maintenance acquired from the NVRAM 44. When the current time measured by the RTC matches the time t1, the power supply controller 46 starts the image forming apparatus 1.

The time t2 is the scheduled start time of the periodic maintenance. At the time t2, the power supply controller 46 controls the image forming apparatus 1 to start the periodic maintenance.

Assume that, at a time t3 during the periodic maintenance, an event for which the power supply controller 46 maintains power-on occurs. Examples of the event include a power on time of a weekly timer, an automatic firmware update time, and log accumulation time.

At a time t4, the periodic maintenance ends, and the power supply controller 46 automatically shuts down (turns off) the image forming apparatus 1.

In this case, there is a risk that the main power supply is turned off even though the weekly timer sets the power on or a risk of failure of automatic firmware update.

A description is given of a functional configuration of the image forming apparatus 1 as one example of information processing apparatuses according to embodiments of the present disclosure.

Figure 4:
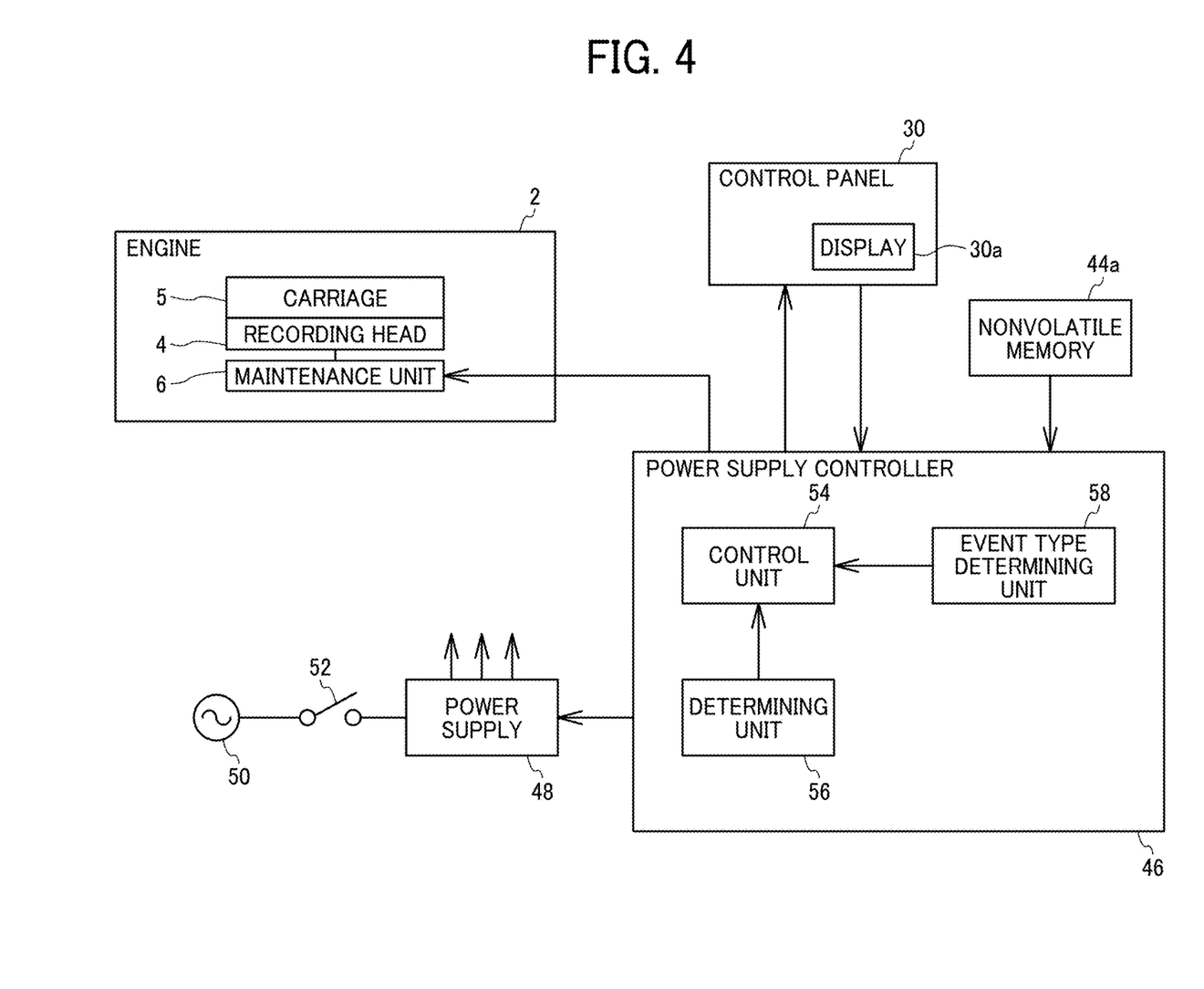
FIG. 4 is a block diagram illustrating an example of a functional configuration of the image forming apparatus according to embodiments of the present disclosure.

FIG. 4 is a block diagram illustrating the functional configuration of the image forming apparatus 1.

A description is given below of, as one example of execution of a scheduled event, turning on and off the power supply 48, with a weekly timer function, in accordance with a power-on time and a power-off time set for each day of week for a predetermined event. The predetermined event is stored, for example, in a memory by a manufacture or an operator.

The image forming apparatus 1 includes the maintenance unit 6, a non-volatile memory 44a, and the power supply controller 46.

The maintenance unit 6 performs maintenance of a component to be maintained.

The non-volatile memory 44a stores a scheduled time of periodic maintenance to be executed by the maintenance unit 6.

The power supply controller 46 has a weekly timer function of turning on and off the power supply 48 in accordance with an on time/off time set for each day of the week, relating to a predetermined event. The predetermined event is stored, for example, in a memory by a manufacture.

A description is given below of a functional configuration of the power supply controller 46. The functional units described below are implemented by the CPU 501 executing a program. The power supply controller 46 includes a control unit 54, a determining unit 56, and an event type determining unit 58. The control unit 54 controls turning on and off of the power supply 48. The control unit 54 turns on the power supply 48 prior to execution of the periodic maintenance by the maintenance unit 6, based on the scheduled time acquired from the non-volatile memory 44a. The control unit 54 shuts down the image forming apparatus 1 after completion of the periodic maintenance.

The power supply controller 46 may acquire the scheduled time, based on which the power supply 48 is turned on, from an external server via the communication I/F 40.

When a power-on time of the power supply 48 set by the weekly timer function arrives during the periodic maintenance, the control unit 54 controls the state of the power supply 48 to be kept at the on-state even after the completion of the periodic maintenance.

The determining unit 56 determines whether or not the apparatus has started for the periodic maintenance based on the difference between the scheduled time of the periodic maintenance and the start time of the power supply 48.

When the determining unit 56 determines that the apparatus has started for the periodic maintenance, the control unit 54 turns off the power supply 48 after the periodic maintenance ends.

The power supply controller 46 includes the determining unit 56 that determines whether or not the startup is for the periodic maintenance based on the difference between the scheduled time of the periodic maintenance and the start time of the apparatus.

When determining that the apparatus has started not for the periodic maintenance, the determining unit 56 determines that the apparatus has started in response to operation of the power switch 52. At the startup of the apparatus, the maintenance unit 6 performs startup maintenance (e.g., nozzle refreshing) different from the periodic maintenance set by the timer function. The control unit 54 controls the state of the power supply 48 to be kept at the on- state after the startup maintenance ends.

When the difference is equal to or smaller than a threshold value (reference value), the determining unit 56 determines that the apparatus has started for the periodic maintenance. By contrast, when the difference is larger than the threshold value, the determining unit 56 determines that the apparatus has started in response to turning on of the power switch 52.

The determining unit 56 may calculate the threshold value (reference value) by machine learning.

Machine learning is a technique for causing a computer to acquire learning ability such as that of a person. Machine learning refers to a technique in which a computer autonomously generates an algorithm for determination such as data identification from learning data acquired in advance, and performs prediction by applying the algorithm to new data. The learning method for machine learning may be any one of supervised learning, unsupervised learning, semi-supervised learning, reinforcement learning, and deep learning. Alternatively, two or more of these learning methods may be combined.

The image forming apparatus 1 includes the control panel 30.

During the execution of the periodic maintenance, the control unit 54 displays, on the control panel 30, a screen including a cancel button that receives cancellation of shutdown after the completion of periodic maintenance. In response to pressing of the cancel button, the control unit 54 controls the state of the power supply 48 to be kept at the on-state even after the completion of the periodic maintenance.

The control unit 54 shuts down the image forming apparatus 1 in response to completion of the periodic maintenance in a case where an event occurs during the periodic maintenance and ends during the periodic maintenance.

The event type determining unit 58 determines the type of an event that occurs in the image forming apparatus 1. The control unit 54 determine whether or not to perform shutdown after the end of the event based on the determination result by the event type determining unit 58.

When an error occurs during the periodic maintenance, the control unit 54 cancels the shutdown.

The component to be maintained is the recording head 4 to discharge ink to a recording medium, to form an image thereon.

A description is given of operation of the image forming apparatus 1.

Figure 5:
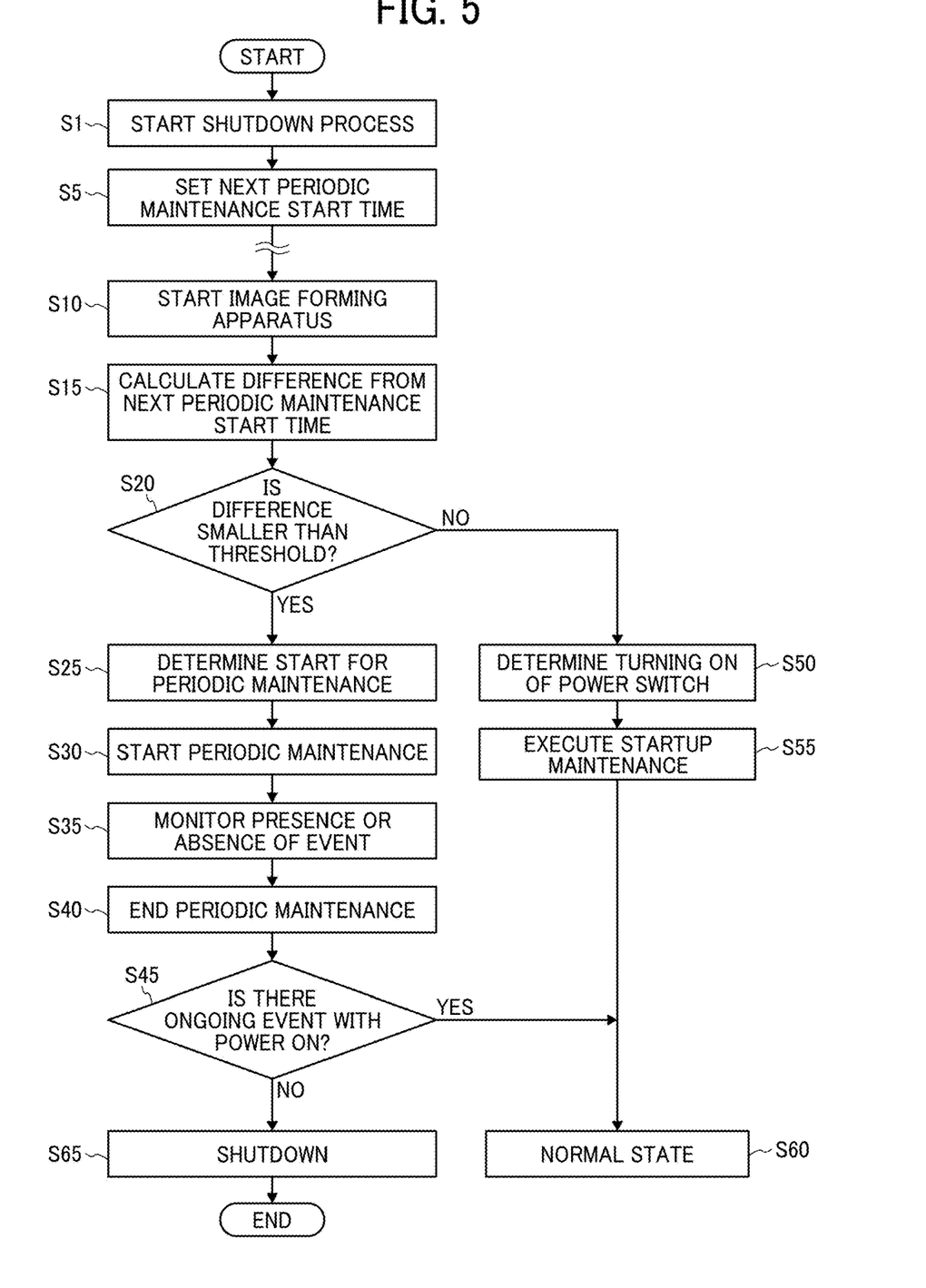
FIG. 5 is a flowchart illustrating operation of the image forming apparatus according to a first embodiment.

FIG. 5 is a flowchart illustrating the operation of the image forming apparatus 1 as one example of the information processing apparatus according to the first embodiment.

First, in step S1, in response to a user operation of turning the power switch off, the control unit 54 starts the shutdown process.

In step S5, the control unit 54 sets the start time of the next periodic maintenance in the NVRAM 44 before turning off the power supply 48. Accordingly, the power supply 48 turns on in accordance with the start time of the next periodic maintenance.

In step S10, the control unit 54 starts the image forming apparatus 1. That is, in response to turning on of the power switch, or when the time counted by the timer reaches the start date and time acquired from the NVRAM 44, the control unit 54 starts.

In step S15, the control unit 54 calculates the difference between the time counted by the timer and the scheduled start time of the next periodic maintenance acquired from the NVRAM 44.

In step S20, the control unit 54 determines whether or not the calculated difference is smaller than a threshold value.

When the difference is smaller than the threshold value, the control unit 54 proceeds to step S25. On the other hand, when the difference is larger than the threshold value, the control unit 54 proceeds to step S35.

When the difference is smaller than the threshold value (Yes in S20), in step S25, the control unit 54 determines that the image forming apparatus 1 has started for the periodic maintenance.

In step S30, the control unit 54 issues a periodic maintenance instruction to the engine 2 to cause the maintenance unit 6 to start the periodic maintenance.

In step S35, the control unit 54 monitors the presence or absence of an event. That is, the control unit 54 monitors an event that occurs during the periodic maintenance. For example, the control unit 54 monitors the power-on time of the weekly timer, the automatic firmware update time, and the like.

In step S40, the control unit 54 ends the periodic maintenance.

In step S45, the control unit 54 determines whether or not an event for which the power-on is to be maintained is ongoing. Determining that there is an ongoing event for which the power-on is to be maintained (Yes in S45), the control unit 54 proceeds to step S60, and cancels the shutdown. On the other hand, determining that there is no ongoing event for which the power-on is to be maintained (No in S45), the control unit 54 proceeds to step S65.

In step S50, when the difference value is larger than the threshold value, the control unit 54 determines that the user has turned on the power switch.

In step S55, the control unit 54 executes the startup maintenance.

In step S60, the control unit 54 shifts to the normal state. With a notification, issued to the engine 2, indicating that the state has shifted to the normal state, the engine 2 can execute functions such as printing and scanning.

In step S65, the control unit 54 shuts down the image forming apparatus 1. However, the control unit 54 is on standby until the next periodic maintenance time.

A description is given of a second embodiment.

Figure 6:
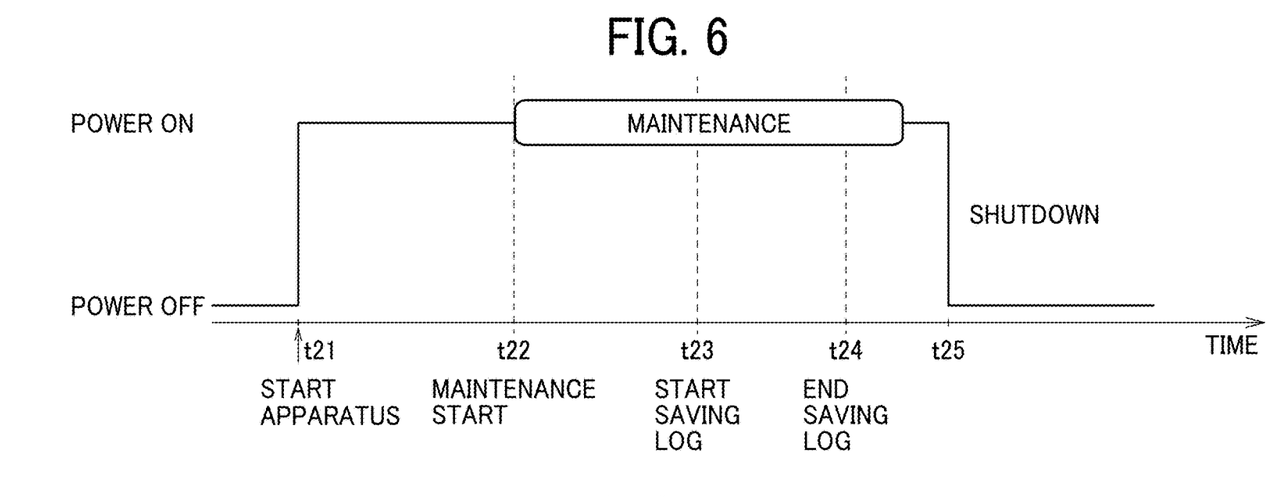
FIG. 6 is a timing chart illustrating operation of the image forming apparatus according to a second embodiment.

FIG. 6 is a flowchart illustrating the operation of the image forming apparatus 1 as the information processing apparatus according to the second embodiment.

Referring to FIG. 6, a time t21 is earlier by a threshold time than a scheduled start time (time t22) of the periodic maintenance acquired from the NVRAM 44. When the current time measured by the RTC matches the time t21, the control unit 54 starts the image forming apparatus 1.

The time t22 is the scheduled start time of the periodic maintenance. At the time t22, the control unit 54 controls the image forming apparatus 1 to start the periodic maintenance.

Assume that, at a time t23 during the periodic maintenance, an event for which the control unit 54 maintains power-on occurs. Examples of the event include a power-on time of a weekly timer, an automatic firmware update time, and log accumulation time. For example, as the event, a log saving has started.

At a time t24, it is assumed that the log saving ends before completion of the periodic maintenance.

At a time t25, the periodic maintenance ends, and the control unit 54 automatically shuts down the image forming apparatus 1.

A description is given of a third embodiment.

Figure 7:
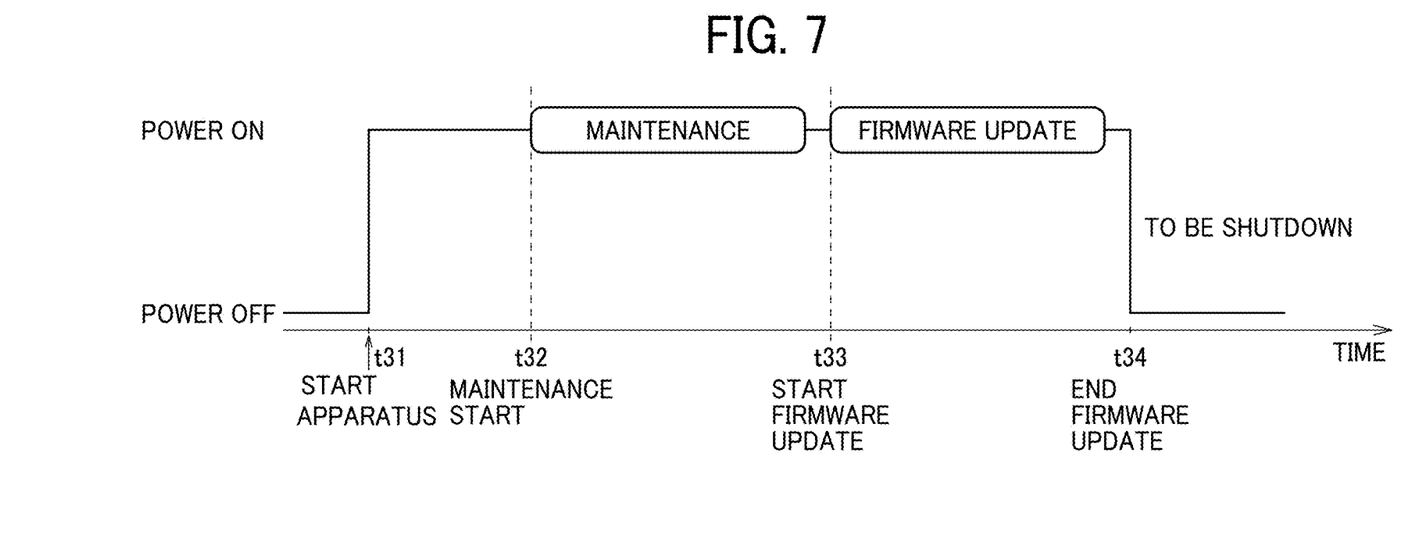
FIG. 7 is a timing chart illustrating operation of the image forming apparatus according to a third embodiment.

FIG. 7 is a flowchart illustrating the operation of the image forming apparatus 1 as the information processing apparatus according to the third embodiment.

Depending on the event type, it is desirable not to shutdown the apparatus after the end of the maintenance but to shutdown the apparatus after the end of the event.

Referring to FIG. 7, a time t31 is earlier by a threshold time than a scheduled start time (time t32) of the periodic maintenance acquired from the NVRAM 44. When the current time measured by the RTC matches the time t31, the control unit 54 starts the image forming apparatus 1.

The time t32 is the scheduled start time of the periodic maintenance. At the time t32, the control unit 54 controls the image forming apparatus 1 to start the periodic maintenance.

At the time t33, when the firmware update start time arrives, the control unit 54 postpones the shutdown. Then, the CPU 32 starts the firmware update.

At time t34 at which the firmware update ends, the control unit 54 plans to shut down the apparatus.

Whether or not to shutdown the apparatus depends on the event type. The control unit 54 refers to a management table such as that illustrated in FIG. 8, to determine whether to shutdown the apparatus.

Figure 8:
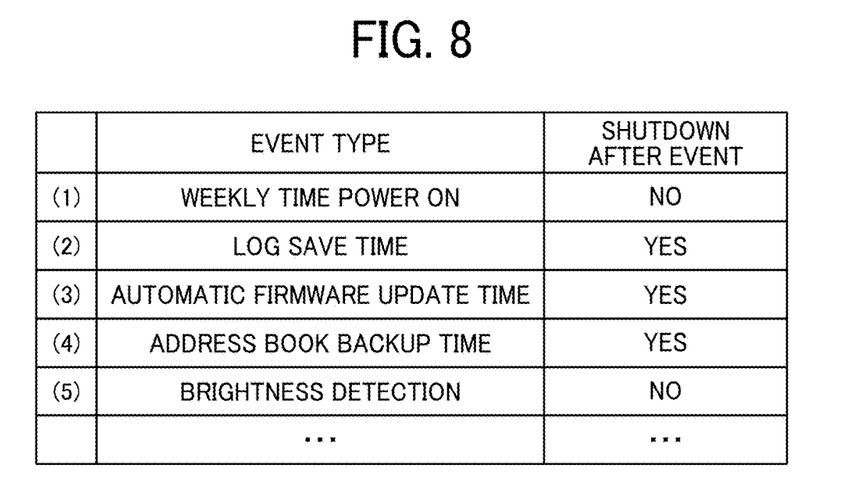
FIG. 8 is an event management table for the image forming apparatus according to a third embodiment.

FIG. 8 is an event management table for the image forming apparatus 1 as the information processing apparatus according to the third embodiment.

FIG. 8 illustrates an example of the management table that stores information indicating whether or not to shut down the apparatus after an event ends in association with the event type.

(1) When the event type is the weekly timer power-on, the table in FIG. 8 indicates that the shutdown is not performed after the event ends.

(2) When the event type is the log saving time, shutdown is performed after the event ends.

(3) When the event type is the firmware update time, shutdown is performed after the event ends.

(4) When the event type is address book backup time, shutdown is performed after the event ends.

(5) When the event type is brightness detection, the shutdown is not performed after the event ends.

A description is given of a fourth embodiment.

Figure 9:
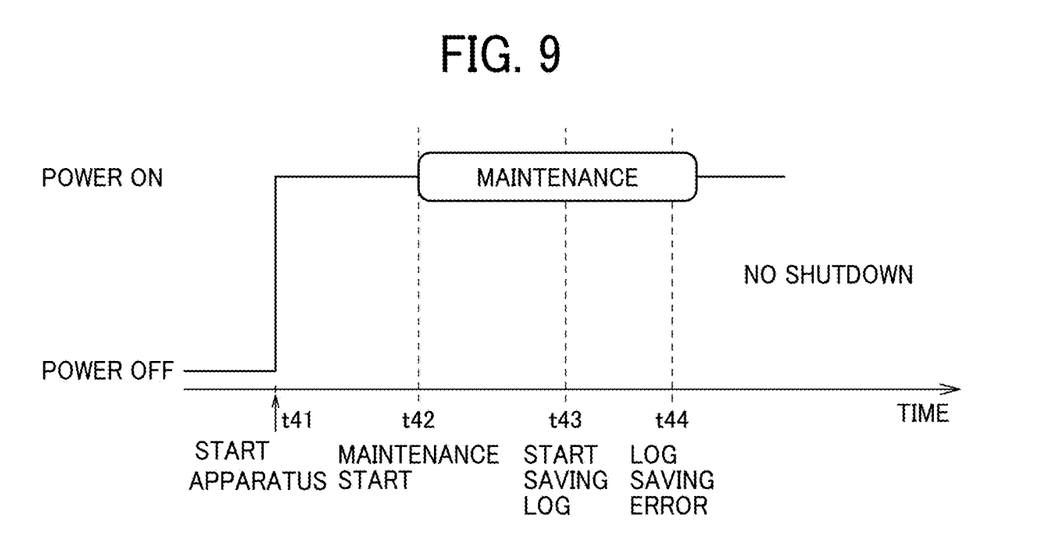
FIG. 9 is a timing chart illustrating operation of the image forming apparatus according to a fourth embodiment.

FIG. 9 is a timing chart illustrating the operation of the image forming apparatus 1 as the information processing apparatus according to the fourth embodiment.

Assume that the image forming apparatus 1 automatically starts, and some error occurs during the periodic maintenance. In this case, if the image forming apparatus 1 is shut down after the periodic maintenance ends, the image forming apparatus 1 fails to notify the user of an abnormality (error) in the apparatus. Then, the countermeasure for the abnormality is not taken.

Referring to FIG. 9, a time t41 is earlier by a threshold time than a scheduled start time (time t42) of the periodic maintenance acquired from the NVRAM 44. When the current time measured by the RTC matches the time t41, the control unit 54 starts the image forming apparatus 1.

The time t42 is the scheduled start time of the periodic maintenance. At the time t42, the control unit 54 controls the image forming apparatus 1 to start the periodic maintenance.

At a time t43, the control unit 54 starts log saving (log saving occurs) during the periodic maintenance.

At a time t44, a log saving error occurs during the periodic maintenance. Such an error is not limited to a log saving error.

Even after the periodic maintenance ends, the control unit 54 does not shut down the apparatus.

A description is given of operation of the image forming apparatus 1 according to a fifth embodiment.

Figure 10:
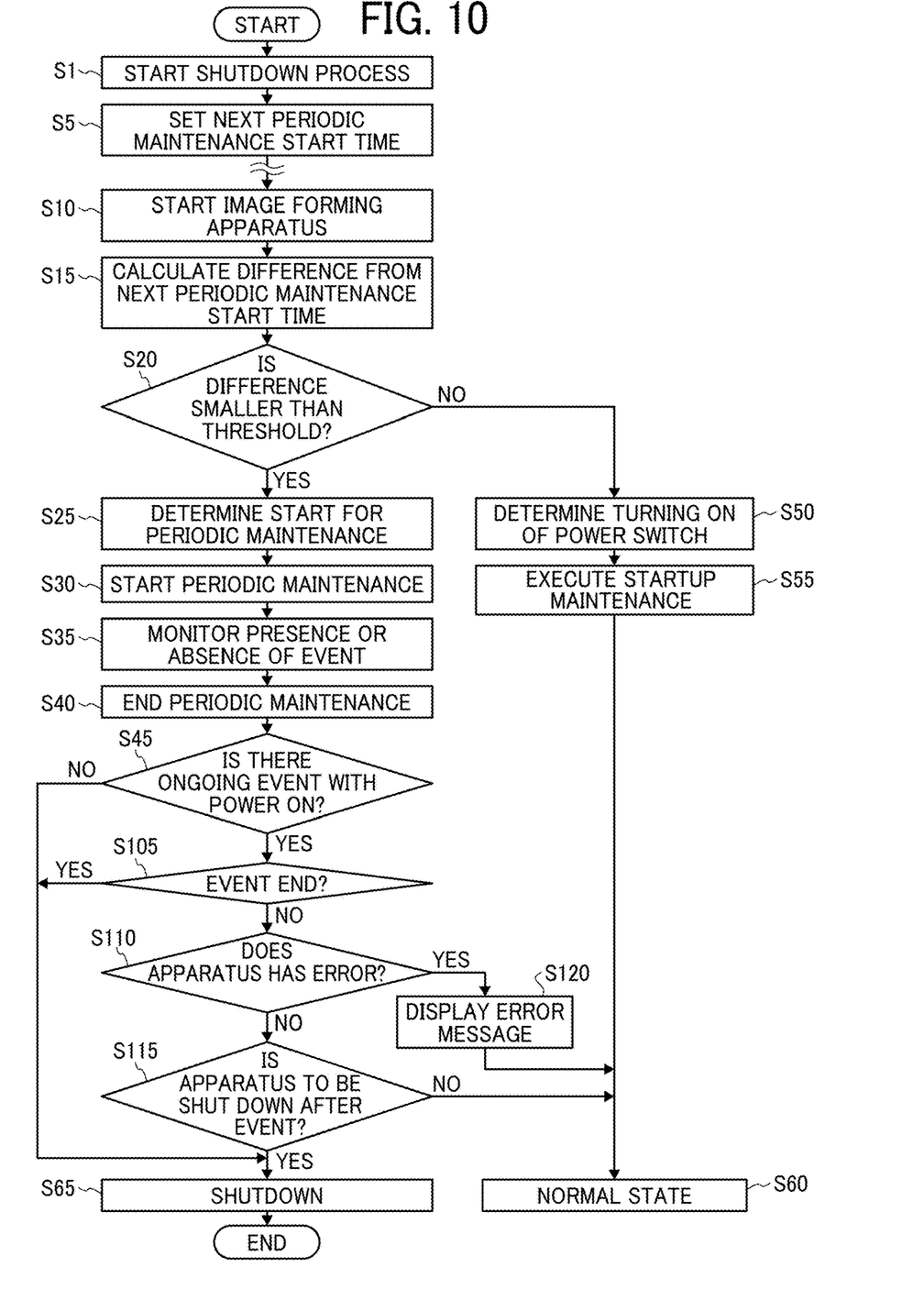
FIG. 10 is a flowchart illustrating the operation of the image forming apparatus according to a fifth embodiment.

FIG. 10 is a flowchart illustrating the operation of the image forming apparatus 1 as the information processing apparatus according to the fifth embodiment. The operation from step S1 to step S65 in FIG. 10 are the same as the operation from step S1 to step S65 in FIG. 5 in the first embodiment, and the description thereof are simplified.

In step S45, the control unit 54 determines whether or not an event for which the power-on is to be maintained is ongoing. The control unit 54 proceeds to step S105 in response to determining that an event for which the power-on is to be maintained is ongoing. On the other hand, the control unit 54 proceeds to step S65 in response to determining that there is no ongoing event for which the power-on is to be maintained.

In step S105, the control unit 54 determines whether or not the event has ended. In response to determining that the event has ended, the control unit 54 proceeds to step S65. On the other hand, in response to determining that the event has not ended, the control unit 54 proceeds to step S110.

In step S110, the control unit 54 determines whether or not an error has occurred in the apparatus. In response to determining the occurrence of an error (Yes in S110), the control unit 54 proceeds to step S120. In response to determining that no error has occurred (No in S110), the control unit 54 proceeds to step S115.

In step S115, the control unit 54 refers to the management table (FIG. 8) and determines whether or not the shutdown is set after the event ends. The control unit 54 proceeds to step S60 in response to determining that shutdown is not set after the event ends. On the other hand, the control unit 54 proceeds to step S65 in response to determining that the shutdown is set after the event ends.

In step S120, the control unit 54 displays, on the display 30*a*, an error screen presenting a message indicating that an error has occurred. Then, the process proceeds to step S60.

A description is given of screen transition according to a sixth embodiment.

Figure 11:
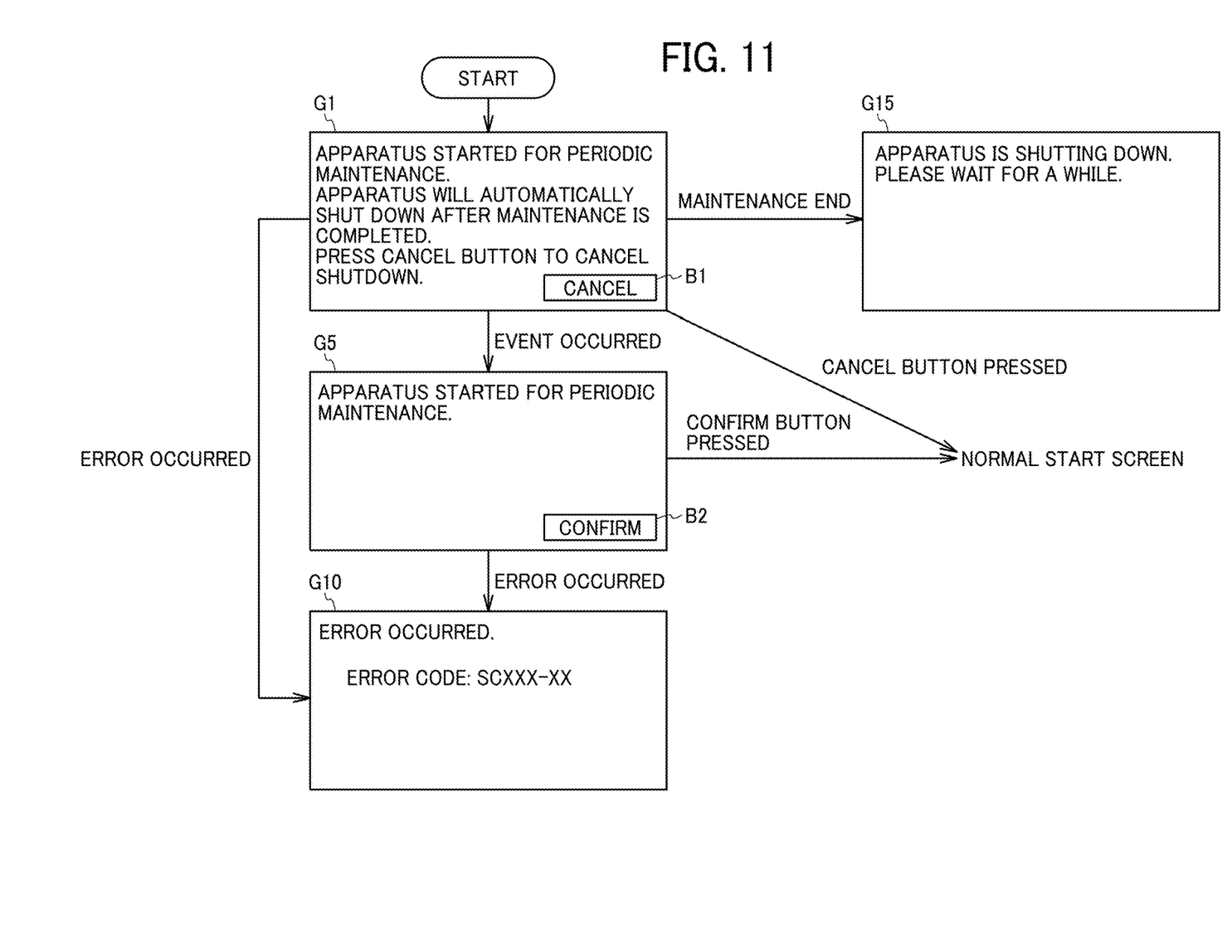
FIG. 11 illustrates screen transition in the image forming apparatus according to a sixth embodiment.

FIG. 11 illustrates screen transition in the image forming apparatus 1 as the information processing apparatus according to the sixth embodiment. FIG. 11 illustrates screens G1 to G15 generated by the control unit 54 and displayed on the display 30*a*.

When the apparatus is started to execute periodic maintenance, the control unit 54 displays the screen G1 on the display 30*a*. The screen G1 presents a notification of the automatic start. For example, the screen G1 presents the following message.

"Apparatus started for periodic maintenance and automatically shuts down after maintenance is completed. Press cancel button to cancel shutdown."

On the screen G1, a cancel button B1 is displayed.

When the user wishes to continue the use of the apparatus, the user presses the cancel button B1. When the cancel button B1 is pressed, the screen G1 disappears and the screen shifts to the normal start screen.

When the power-on time of the weekly timer comes and an event starts while the screen G1 is displayed, the screen G5 is displayed.

If any error occurs in the apparatus while the screen G1 is displayed, the error screen G10 is displayed.

When the periodic maintenance is ended without occurrence of an event while the screen G1 is displayed, the screen G15 is displayed.

When an event starts while the screen G1 is displayed, the apparatus is not shut down. Accordingly, the screen G5 presents the following message.

"The apparatus is started for periodic maintenance."

The screen G5 includes a confirm button B2. When the confirm button B2 is pressed, the screen G5 disappears, and the normal start screen is displayed.

If any error occurs in the device while the screen G5 is displayed, the error screen G10 is displayed.

The screen G10 presents a message such as:

"Error occurred. Error code: Scxxx-xx."

The screen G15 presents a message such as:

"The apparatus is shutting down. Please wait for a while."

A seventh embodiment is described below.

Figure 12:
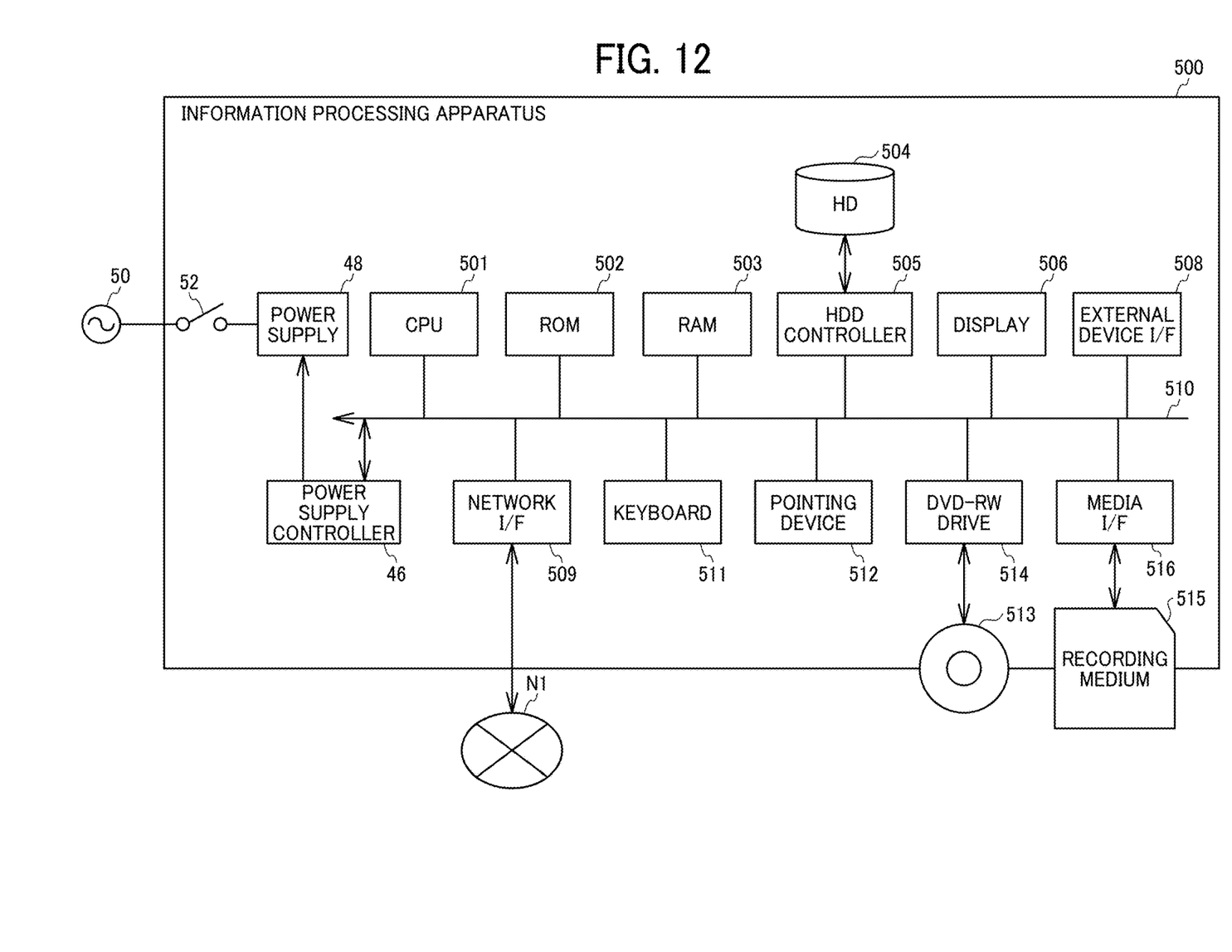
FIG. 12 is a block diagram illustrating a hardware configuration of an information processing apparatus according to a seventh embodiment.

FIG. 12 is a block diagram illustrating a hardware configuration of an information processing apparatus according to a seventh embodiment.

FIG. 12 illustrates an information processing apparatus 500 that is implemented by, for example, a computer. As illustrated in FIG. 12, the information processing apparatus 500 includes a CPU 501, a ROM 502, a RAM 503, a hard disk (HD) 504, an HDD controller 505, a display 506, an external device interface I/F 508, a network I/F 509, a bus line 510, a keyboard 511, a pointing device 512, a digital versatile disk-rewritable (DVD-RW) drive 514, a media I/F 516, the power supply controller 46, and the power supply 48.

The CPU 501 controls the entire operation of the information processing apparatus 500. The ROM 502 stores a control program for driving the CPU 501, such as an initial program loader (IPL). The RAM 503 is used as a work area for the CPU 501. The HD 504 is a storage area that stores various data such as a program. The HDD controller 505 controls reading and writing of various data from and to the HD 504 under control of the CPU 501. The display 506 displays various information such as a cursor, a menu, a window, a character, or an image. The external device I/F 508 is an interface for connecting to various external devices. Examples of the external device include, but are not limited to, a universal serial bus (USB) memory and a printer.

The network I/F 509 is an interface for performing data communication via the communication network N1. Examples of the bus line 510 include an address bus and a data bus. The bus line 510 electrically connects the elements illustrated in FIG. 12, such as the CPU 501, with each another.

The keyboard 511 is an example of an input device provided with a plurality of keys for allowing a user to input characters, numerals, or various instructions. The pointing device 512 is an example of an input device that allows a user to select or execute various instructions, select a target for processing, or move a cursor being displayed. The DVD-RW drive 514 reads and writes various data from and to a DVD-RW 513, which is an example of a removable recording medium. The removable recording medium is not limited to a DVD-RW and may be digital versatile disc-recordable (DVD-R) or the like. The media I/F 516 controls reading and writing (storing) of data from and to a recording medium 515 (a storage medium) such as a flash memory.

The power supply controller 46 and the power supply 48 illustrated in FIG. 12 will be described.

The power supply controller 46 controls turning on and off of the power supply 48. The power supply controller 46 incorporates a real time clock (RTC) that measures time. The power supply controller 46 starts the image forming apparatus 1 upon arrival of a preset time while the power supply 48 is off.

The power supply 48 is connected to a commercial power supply 50 (e.g., an AC power supply) via a power switch 52. While the power switch 52 is on, the power supply 48 converts AC power supplied from the AC power supply into direct-current (DC) power and supplies the DC power to each component of the apparatus.

The power supply controller 46 and the power supply 48 are the same as those illustrated in FIG. 2 (first embodiment).

The information processing apparatus 500 according to the seventh embodiment, illustrated in FIG. 12, has a configuration similar to that illustrated in FIG. 4 and operates similar to the first to sixth embodiments described with reference to FIGS. 5 to 11. Thus, redundant descriptions are omitted.

In the first embodiment to the sixth embodiment, the periodic maintenance is described as the nozzle cleaning of the inkjet recording head 4.

By contrast, in the information processing apparatus 500 according to the seventh embodiment, examples of the periodic maintenance include the backup of the HD 504 and the connection test of the network module mounted on the network I/F 509.

The embodiments described above concern turning on and off of the power supply 48 due to periodic maintenance. According to an aspect of the present disclosure, during the periodic maintenance, the information processing apparatus monitors the occurrence of an event that uses the power of the power supply 48, and cancels shutdown after the end of the periodic maintenance.

With this configuration, even when the time at which the power supply 48 is turned on by the timer function or the automatic firmware update time arrives during the periodic maintenance, the information processing apparatus performs these events. Accordingly, automatic firmware update or the like is executable. Thus, the convenience improves.

Aspect 1

Aspect 1 of the present embodiment concerns an information processing apparatus (e.g., the image forming apparatus 1) that includes a maintenance unit (6) that performs maintenance on a component (e.g., the recording head 6) to be maintained, and a power supply controller (46) having a timer function to turn on a power supply (48) to the information processing apparatus at a power-on time set in advance. The power supply controller acquires, from a memory, a scheduled time of periodic maintenance to be executed on the component; turns on the power supply at a time prior to the scheduled time of the periodic maintenance; and shuts down the apparatus in response to an end of the periodic maintenance. Further, in response to arrival determining that the power-on time by the timer arrives during execution of the periodic maintenance, the power supply controller maintains the power supply without shutting down the apparatus after the periodic maintenance ends.

According to this aspect, in a case where the power-on time of the power supply set by the timer function arrives during the periodic maintenance, the power supply controller controls the state of the power supply to be kept at the on-state even after the end of the periodic maintenance.

Accordingly, the power-on state is maintained in the case where the time to execute the scheduled event arrives during the periodic maintenance.

Aspect 2

The information processing apparatus of Aspect 1 further includes a determining unit (56) that determines whether the apparatus has started for the periodic maintenance based on a difference value between a scheduled time of the periodic maintenance and a time at which the power supply (48) has turned on. When the determining unit determines that the apparatus has started for the periodic maintenance, the power supply controller turns off the power supply after the periodic maintenance ends.

According to this aspect, when the determining unit determines that the apparatus has started for the periodic maintenance, the power supply is turned off after the periodic maintenance ends.

Aspect 3

The information processing apparatus of Aspect 3 further includes a determining unit (56) that determines whether the apparatus has started for the periodic maintenance based on a difference value between a scheduled time of the periodic maintenance and a time at which the power supply has turned on. In response to determining that the apparatus has started not for the periodic maintenance, the determining unit determines that the apparatus has started in response to operation of the power switch, and the power supply controller controls the state of the power supply to be kept at the on-state after the startup maintenance ends.

According to this aspect, when determining that the apparatus has started not for the periodic maintenance, the on-state of the power supply is maintained even after the startup maintenance ends.

Aspect 4

According to Aspect 4, the determining unit determines that the apparatus has started for the periodic maintenance when the difference is within the threshold value, and determines that a power switch (52) is turned on when the difference is larger than the threshold value.

According to Aspect 4, based on the threshold value, the determining unit determines whether the apparatus has started for the periodic maintenance or in response to turn-on operation of the power switch.

The determining unit may calculate the threshold value (reference value) by machine learning.

Machine learning is a technique for causing a computer to acquire learning ability such as that of a person. Machine learning refers to a technique in which a computer autonomously generates an algorithm for determination such as data identification from learning data acquired in advance, and performs prediction by applying the algorithm to new data. The learning method for machine learning may be any one of supervised learning, unsupervised learning, semi-supervised learning, reinforcement learning, and deep learning. Alternatively, two or more of these learning methods may be combined.

Aspect 5

In the information processing apparatus according to Aspect 5, the threshold value serving as the reference is calculated by machine learning.

According to this aspect, the threshold value can be calculated by machine learning.

Aspect 6

According to Aspect 6, the information processing apparatus includes a control panel (30). During the execution of the periodic maintenance, the power supply controller displays, on the control panel, a cancel button that receives cancellation of shutdown after the completion of periodic maintenance. In response to pressing of the cancel button, the power supply controller controls the state of the power supply to be kept at the on-state even after the end of the periodic maintenance.

According to this aspect, based on the pressing of the cancel button, the on-state of the power supply is maintained even after the periodic maintenance ends.

Aspect 7

According to Aspect 7, the power supply controller shuts down the apparatus in response to completion of the periodic maintenance in a case where an event occurs during the periodic maintenance and ends during the periodic maintenance.

According to this aspect, in a case where an event occurs during the periodic maintenance and the event ends during the periodic maintenance, the apparatus is shut down after the periodic maintenance ends.

Aspect 8

According to Aspect 8, the information processing apparatus includes an event type determining unit that determines a type of the event. The power supply controller determines whether to shut down the apparatus in response to the end of the event based on the event type determined.

According to this aspect, the power supply controller determines whether to perform shutdown after the event ends, based on the type of the event determined by the event type determining unit.

Aspect 9

According to Aspect 9, the power supply controller (46) cancels the shutdown when an error occurs during the periodic maintenance.

According to this aspect, when an error occurs during the periodic maintenance, shutdown is canceled.

Aspect 10

According to Aspect 10, the component to be maintained is a recording head (4) that discharges ink to a recording medium, to form an image thereon.

When a power-on time of the power supply 48 set by the weekly timer function arrives during the periodic maintenance, the on-state of the power supply is maintained even after the completion of the periodic maintenance.

Aspect 11

This aspect concerns a method for controlling an apparatus that includes a component (e.g., the recording head 4) to be maintained, a maintenance unit (6) that performs maintenance on the component, and a power supply controller (46) having a timer function to turn on a power supply at a power-on time set in advance. The method includes acquiring, from a memory, a scheduled time of periodic maintenance to be executed on the component; turning on the power supply at a time prior to the scheduled time of the periodic maintenance; shutting down the apparatus in response to an end of the periodic maintenance; and, in response to arrival of the power-on time during execution of the periodic maintenance, maintaining the power-on state of the power supply without shutting down the apparatus after the end of the periodic maintenance.

According to Aspect 11, in a case where the power-on time of the power supply set by the timer function arrives during the periodic maintenance, the power supply controller controls the state of the power supply to be kept at the on-state even after the end of the periodic maintenance.

Accordingly, the power-on state is maintained in the case where the time to execute the scheduled event arrives during the periodic maintenance.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing apparatus comprising:
   a component to be maintained;
   a maintenance engine configured to perform maintenance on the component; and circuitry configured to:
   turn on a power supply to the apparatus at a power-on time set in advance by a timer;
   acquire, from a memory, a scheduled time of periodic maintenance to be executed on the component;
   turn on the power supply at a time prior to the scheduled time of the periodic maintenance;
   shut down the apparatus in response to an end of the periodic maintenance; and
   in response to an arrival of the power-on time by the timer during execution of the periodic maintenance, control a state of the power supply to be kept at an on-state after the periodic maintenance ends.

2. The information processing apparatus according to claim 1, wherein the circuitry:
   calculates a difference between the scheduled time of the periodic maintenance and a time at which the power supply has turned on;
   determines whether the power supply has turned on for the periodic maintenance; and turns off the power supply in response to the end of the periodic maintenance based on a determination that the power supply has turned on for the periodic maintenance.

3. The information processing apparatus according to claim 2, wherein the circuitry:
   causes the maintenance engine to perform startup maintenance on the component based on a determination that the power supply has turned on not for the periodic maintenance, the startup maintenance being different from the periodic maintenance; and
   controls the state of the power supply to be kept at the on-state after the startup maintenance ends.

4. The information processing apparatus according to claim 2, wherein the circuitry:
   determines that the power supply has turned on for the periodic maintenance based on a determination that the difference is equal to or smaller than a threshold value; and
   determines that a power switch of the information processing apparatus has been turned on based on a determination that the difference is larger than the threshold value.

5. The information processing apparatus according to claim 4,
   wherein the threshold value is calculated by machine learning.

6. The information processing apparatus according to claim 1, further comprising a control panel including a display, the control panel being configured to receive an input operation,
   wherein the circuitry:
   displays, on the control panel, a cancel button during execution of the periodic maintenance, the cancel button being configured to receive cancellation of shutdown, and
   in response to pressing of the cancel button, controls the state of the power supply to be kept at the on-state after the periodic maintenance ends.

7. The information processing apparatus according to claim 1, wherein the circuitry:
   determines presence or absence of an ongoing event in the apparatus in response to the end of the periodic maintenance; and
   shuts down the apparatus in response to an end of the event.

8. The information processing apparatus according to claim 7, wherein the circuitry:
   determines a type of the event; and
   determines whether to shut down the apparatus in response to the end of the event based on the type of the event determined.

9. The information processing apparatus according to claim 1, wherein the circuitry cancels shutdown in response to an occurrence of an error during the periodic maintenance.

10. The information processing apparatus according to claim 1, wherein the component is a recording head configured to discharge ink onto a recording medium to form an image.

11. A method for controlling an apparatus including a component to be maintained, the method comprising:
    turning on a power supply to the apparatus at a power-on time set in advance with a timer;
    acquiring, from a memory, a scheduled time of periodic maintenance to be executed on the component;
    turning on the power supply at a time prior to the scheduled time of the periodic maintenance;
    shutting down the apparatus in response to an end of the periodic maintenance; and
    in response to an arrival of the power-on time by the timer during execution of the periodic maintenance, controlling a state of the power supply to be kept at an on-state after the periodic maintenance ends.

12. A non-transitory recording medium storing a program which, when executed by one or more processors, cause the one or more processors to perform a method for controlling an apparatus including a component to be maintained, the method comprising:
    turning on a power supply to the apparatus at a power-on time set in advance by a timer;
    acquire, from a memory, a scheduled time of periodic maintenance to be executed on the component;
    turning on the power supply at a time prior to the scheduled time of the periodic maintenance;
    shutting down the apparatus in response to an end of the periodic maintenance; and
    in response to an arrival of the power-on time by the timer during execution of the periodic maintenance, controlling a state of the power supply to be kept at an on-state after the periodic maintenance ends.

* * * * *